United States Patent [19]

Krennrich et al.

[11] 4,436,704

[45] Mar. 13, 1984

[54] METHOD OF RECOVERING URANIUM OXIDE FROM ALKALINE SODIUM URANYL CARBONATE SOLUTIONS

[75] Inventors: Otmar Krennrich, Oberursel; Gottfried Brendel; Hartmut Pietsch, both of Bad Homburg, all of Fed. Rep. of Germany

[73] Assignee: Metallgesellschaft Aktiengesellschaft, Frankfurt am Main, Fed. Rep. of Germany

[21] Appl. No.: 391,865

[22] Filed: Jun. 24, 1982

[30] Foreign Application Priority Data

Jul. 22, 1981 [DE] Fed. Rep. of Germany ....... 3128855

[51] Int. Cl.³ ............................................. C01G 43/025
[52] U.S. Cl. ........................................ 423/11; 423/17; 423/253; 423/261
[58] Field of Search ................... 423/17, 253, 261, 11

[56] References Cited

U.S. PATENT DOCUMENTS

| 2,866,680 | 12/1958 | Long | 423/10 X |
| 2,900,229 | 8/1959 | McClaine | 423/17 |
| 3,042,486 | 7/1962 | Forward et al. | 423/261 |
| 3,239,307 | 3/1966 | Reusser | 423/261 X |

FOREIGN PATENT DOCUMENTS 562607 9/1958 Canada ................................. 423/17

OTHER PUBLICATIONS

Merritt, Robert C., *The Extractive Metallury of Uranium* Colorado School of Mines Research Institute, 1971, pp. 223-239.

*Primary Examiner*—Deborah L. Kyle
*Assistant Examiner*—Matthew A. Thexton
*Attorney, Agent, or Firm*—Karl F. Ross; Herbert Dubno

[57] ABSTRACT

A method of recovering uranium dioxide from a sodium uranyl carbonate solution obtained by the alkaline carbonate leaching of uranium ore in which a solution is reacted at a temperature above 130° C. and at superatmospheric pressure with particular metallic iron. The precipitated $UO_2$ is recovered from the solution.

6 Claims, No Drawings

METHOD OF RECOVERING URANIUM OXIDE FROM ALKALINE SODIUM URANYL CARBONATE SOLUTIONS

FIELD OF THE INVENTION

Our present invention relates to the recovery of uranium oxide from leaching solutions and especially alkaline solutions of sodium uranyl carbonate. More particularly, the invention relates to improvements in the precipitation of uranium oxide from alkaline sodium uranyl carbonate solutions by reduction with metallic iron at a temperature above the boiling point of the solution and at an elevated pressure, i.e. a superatmospheric pressure.

BACKGROUND OF THE INVENTION

Uranium oxide is an important compound for use in the nuclear fuel industry and can be obtained by hydrometallurgical processes from uranium ores.

Uranium-containing ores whose acid-consuming constituents are present in unduly high proportions so that acid leaching is uneconomical, can be leached with alkaline and preferably aqueous soda (sodium carbonate) solutions so that the uranium as dissolved form is found in the uranyl carbonate ion $[UO_2(CO_3)_3]^{4-}$. This ion can be considered to be present as the dissolved form of sodium uranyl carbonate having the formula $Na_4[UO_2(CO_3)_3]$.

Such solutions thus can be considered to be starting solutions for the recovery of uranium which can proceed through precipitation of the uranium oxide $UO_2$.

Several processes are known for the precipitation of uranium from such solutions, either as the uranium dioxide or in other forms which can ultimately yield the uranium dioxide or a component readily converted to the uranium dioxide.

For example, uranium can be precipitated by the addition of sodium hydroxide to form sodium diuranate $Na_2U_2O_7$. This process can proceed in accordance with the formula $2Na_4[UO_2(CO_3)_3] + 6NaOH \rightarrow Na_2U_2O_7 \downarrow + 6Na_2CO_3 + 3H_2O$.

One of the problems with this method is that the precipitation of the sodium diuranate takes a long time. Another problem is that the sodium hydroxide which is used is comparatively expensive.

The sodium diuranate is then generally introduced into sulfuric acid and the diuranate can be precipitated as the ammonium salt by neutralization with ammonia thereby eliminating the sodium.

In yet another process, alkaline solutions containing low concentrations of uranium can be reduced at temperatures of 100° to 200° and at superatmospheric pressures with hydrogen and hydrogenation or reduction catalysts, e.g. nickel-based catalysts, in accordance with the relationship

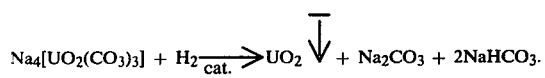

$$Na_4[UO_2(CO_3)_3] + H_2 \xrightarrow{cat.} UO_2 \downarrow + Na_2CO_3 + 2NaHCO_3.$$

This process requires extremely high pressures, the use of expensive hydrogen, costly catalysts and, at least in part because of the high pressures, also expensive equipment.

OBJECTS OF THE INVENTION

It is the principal object of the present invention to provide an improved method of recovering uranium oxide, especially from alkaline uranium-containing leaching solutions whereby the disadvantages of earlier systems are eliminated.

Another object of this invention is to provide an improved method of precipitating low valance uranium oxide from alkaline sodium leaching solutions, containing sodium uranyl carbonate in solution in a simple and economical manner.

It is also an object of this invention to provide a method for the purposes described which can be carried out at lower pressures than heretofore has been the case, using less expensive reagents.

DESCRIPTION OF THE INVENTION

These objects and others which will become apparent hereinafter are attained, in accordance with the invention, by precipitating uranium oxide from the alkaline sodium solution containing $Na_4[UO_2(CO_3)_3]$ by a reduction of this salt at a super-atmospheric pressure and a temperature above the boiling point of the solution (at atmospheric pressure).

In other words, the invention comprises raising the temperature of the solution to a level above its boiling point at atmospheric pressure and maintaining this solution under a superatmospheric pressure in the presence of at least one reducing agent which, according to the invention, can be metallic iron in particulate form. The precipitate, which consists mainly of uranium dioxide, is removed from the solution, e.g. by filtration and can be processed further to yield a particularly high purity product in superior yields.

Preferably the sodium uranyl carbonate solution is a solution which is obtained by leaching uranium-containing ores with a lixiviant at a pH greater than 7 and in the form of an aqueous sodium carbonate solution. The leaching solution is then clarified, e.g. by sedimentation and decantation or by filtration.

We have found, moreover, the best results are obtained when the iron is an iron powder or iron filings of a particle size of 10 to 200 microns, preferably 15 to 50 microns and is used in an amount of 0.5 to 1.5 times (by weight) the quantity of uranium VI.

The preferred operating temperature is above 130° C. and the reaction is generally carried out best with agitation, e.g. in a stirred or shaking autoclave.

In carrying out the invention it has been found to be advantageous to introduce the solution to be reduced into a pressure vessel, e.g. an autoclave, which can be provided with an agitator, to close this vessel and to purge any remaining gas space therein from oxygen by sweeping this space with an inner gas, e.g. nitrogen. The nitrogen can advantageously be bubbled through the solution in the vessel. The vessel can then be sealed and the contents raised to a temperature above 130° C. with the iron powder then being added. Alternatively, iron powder can be added after purging and the vessel then sealed and the contents heated.

Preferably, the vessel and its contents are heated to a temperature of 140° to 200° C. and the reaction conducted at this temperature and the resulting pressure.

The reaction can also be carried out continuously in a tubular reactor by forming a solid-liquid suspension of the metallic iron in the uranium-containing solution and passing the suspension through a tubular reactor in a turbulent flow in a velocity in excess of 0.5 meter per second, preferably a velocity in the range of 2 to 3 meters per second, thereby increasing the intimacy of contact of the reacting solution with the reducing agent and preventing settling of the suspended solids.

When the reaction is carried out in a tubular reactor, the preferred temperature range is 150° to 260° C. and the preferred range is 170° to 240° C. Here as well the superatmospheric pressure is that which results from heating the solution to the reacting temperature.

The reaction time will depend upon completeness of the reaction and the progress of the reduction can be followed by observing the clearing of the originally yellow alkaline sodium solution containing the uranium.

The reaction is usually complete in less than 30 minutes and a residence time in the tubular reactor of up to 10 minutes has been found to be more than sufficient.

The product of the reaction is a suspension. After cooling of the suspension the precipitate as well as the excess metallic iron are removed from the colorless solution. All or part of the alkaline sodium solution can be recycled to the leaching step. The particulate residue can be separated into the uranium oxide and metallic iron components by a magnetic separation which has been found to remove substantially all of the iron.

The iron which is recovered has some uranium dioxide mechanically adherent to it, this being recovered by grinding the magnetically recovered iron component and subjecting it, in turn, to a magnetic separation thereby leaving the uranium oxide which can be combined with the bulk of the precipitate from which the iron originally was removed.

The non-magnetic fraction is in the form of a fine black powder containing about 53% uranium which can be processed further by techniques which have been developed for upgrading, modifying or reacting $UO_2$.

The process of the invention is highly economical and can be carried out with only conventional elevated-pressure processing equipment, the uranium being almost quantitatively precipitated in a very short treatment time.

SPECIFIC EXAMPLE

The reactor consisted of an autoclave, which was equipped with a magnetic stirrer, flow deflectors and an immersion tube which was provided with a needle valve and connected to a helical discharge pipe, which was adapted to be cooled in an ice-water bath.

The autoclave was supplied with 10 grams iron powder (about 1.58 per gram of uranium) and with 3.5 liters of an aqueous solution containing 4.55 g/l $Na_4[UO_2(CO_3)_3]$, 120 g/l $NaHCO_3$ and 25 g/l $Na_2CO_3$ and was purged with nitrogen and heated to 170° C. with stirring. The progress of the reaction was observed in that samples of the reaction solution were repeatedly taken from the autoclave during the experiment and were analyzed for their uranium content. Before the taking of each sample, the stirrer was stopped so that the suspension was permitted to settle and a clogging of the needle valves by solid particles was avoided. The solution was cooled to room temperature as it flowed through the cooling coil and was subsequently filtered.

The following results were obtained:

| Reaction time (minutes) | Temperature °C. | U content of solution g/l |
|---|---|---|
| 0 | room temp. | 2.0 |
| 30 | 115 | ~1.99 |
| 36 | 130 | ~1.94 |
| 50 | 145 | 0.94 |
| 60 | 145 | 0.44 |
| 70 | 150 | 0.20 |
| 80 | 165 | 0.08 |
| 90 | 170 | 0.05 |

If 1.4 to 1.5 grams Fe are added per gram of uranium and temperatures in the range from 145° to 170° C. are employed, 90% of uranium will be precipitated within about 30 minutes and 96% within 40 minutes.

We claim:

1. A method of recovering uranium dioxide from an alkaline sodium uranyl carbonate solution which comprises the steps of:
    heating said solution to a temperature above its boiling point at atmospheric pressure and bringing said solution to a superatmospheric pressure;
    reacting said solution at said temperature and under superatmospheric pressure with particulate metallic iron forming a reducing agent, thereby precipitating uranium dioxide; and
    recovering the precipitated uranium dioxide from the solution.

2. The method defined in claim 1 wherein the metallic iron is added to said solution in a quantity by weight of 0.5 to 1.5 times the uranium content of the solution.

3. The method defined in claim 1 or claim 2 wherein said reaction is carried out by a temperature above 130° C.

4. The method defined in claim 3 wherein the reaction is carried out at a temperature between 140° C. and 260° C.

5. The method defined in claim 4 wherein the reaction is carried out by agitating the solution in the presence of the metallic iron in an autoclave after the solution and metallic iron are introduced therein and the autoclave with the solution therein is purged with an inert gas.

6. The method defined in claim 4 wherein the reaction is carried out by passing a suspension of the iron in said solution through a tubular reactor in turbulent flow.

* * * * *